US011200301B2

(12) United States Patent
Mizumoto (10) Patent No.: US 11,200,301 B2
(45) Date of Patent: Dec. 14, 2021

(54) SETTING SYSTEM AND ELECTRONIC DEVICE

(71) Applicant: KYOCERA CORPORATION, Kyoto (JP)

(72) Inventor: Akira Mizumoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 291 days.

(21) Appl. No.: 16/284,915

(22) Filed: Feb. 25, 2019

(65) Prior Publication Data

US 2019/0278906 A1 Sep. 12, 2019

(30) Foreign Application Priority Data

Feb. 26, 2018 (JP) .............................. JP2018-032078

(51) Int. Cl.
*G06F 21/30* (2013.01)
*G06F 21/46* (2013.01)
*G06K 7/14* (2006.01)
*H04L 9/32* (2006.01)

(52) U.S. Cl.
CPC ............ *G06F 21/305* (2013.01); *G06F 21/46* (2013.01); *G06K 7/1434* (2013.01); *H04L 9/3226* (2013.01); *G06K 7/1417* (2013.01)

(58) Field of Classification Search
CPC .......... G06F 21/46; G06F 21/44; G06F 21/45; H04L 9/3226; H04L 2209/80
See application file for complete search history.

(56) References Cited

U.S. PATENT DOCUMENTS

| 2006/0276172 | A1* | 12/2006 | Rydgren | ............. H04W 12/126 455/410 |
| 2008/0144095 | A1* | 6/2008 | Suzuki | ................ H04L 61/1535 358/1.15 |
| 2008/0150677 | A1* | 6/2008 | Arakawa | ............. B60R 25/2018 340/5.2 |
| 2008/0204199 | A1* | 8/2008 | Howarth | ............. H04L 41/0806 340/10.1 |
| 2013/0316644 | A1* | 11/2013 | Hirabayashi | .......... H04W 12/06 455/26.1 |
| 2014/0215496 | A1* | 7/2014 | Sexton | ................ G06F 3/04883 719/318 |
| 2014/0378095 | A1* | 12/2014 | Sugaya | ................. H04L 63/107 455/410 |
| 2016/0105415 | A1* | 4/2016 | Hiramoto | ................ G06F 21/44 726/7 |
| 2017/0104807 | A1* | 4/2017 | Braun | .................... H04L 67/125 |
| 2018/0288218 | A1* | 10/2018 | Aravapalli | ........ H04M 1/72469 |

FOREIGN PATENT DOCUMENTS

| JP | 2014211771 A | 11/2014 |
| JP | 2015-007837 A | 1/2015 |
| JP | 2015121662 A | 7/2015 |

* cited by examiner

*Primary Examiner* — Huan V Doan
(74) *Attorney, Agent, or Firm* — Duane Morris LLP (57) ABSTRACT

A setting system comprises a first electronic device and a second electronic device. The first electronic device is configured to output a password and setting information for the second electronic device. The second electronic device is configured to acquire the password and the setting information from the first electronic device, change setting of the second electronic device on the basis of the setting information, and lock the setting of the second electronic device using the password.

16 Claims, 6 Drawing Sheets

FIG. 7

SETTING SYSTEM AND ELECTRONIC DEVICE

CROSS-REFERENCE TO RELATED APPLICATION

The present application claims priority to and the benefit of Japanese Patent Application No. 2018-032078 filed Feb. 26, 2018, the entire contents of which are incorporated herein by reference.

TECHNICAL FIELD

The present disclosure relates to a setting system and an electronic device.

BACKGROUND

A configuration for setting security on a terminal is known.

SUMMARY

A setting system according to an embodiment of the present disclosure comprises a first electronic device and a second electronic device. The first electronic device is configured to output a password and setting information for the second electronic device. The second electronic device is configured to acquire the password and the setting information from the first electronic device, change a setting of the second electronic device on the basis of the setting information, and lock the setting of the second electronic device using the password.

An electronic device according to an embodiment of the present disclosure is configured to output a password and setting information for another electronic device. The setting information is to be used to set the another electronic device. The password is used to lock a setting of the another electronic device.

An electronic device according to an embodiment of the present disclosure is configured to acquire a password and setting information for the electronic device from another electronic device, change a setting of the electronic device on the basis of the setting information, and lock the setting of the electronic device using the password.

A setting method according to an embodiment of the present disclosure includes a step in which a first electronic device outputs a password and setting information for a second electronic device. In the setting method, the second electronic device acquires the password and the setting information from the first electronic device, changes a setting of the second electronic device on the basis of the setting information, and locks the setting of the second electronic device using the password.

A non-transitory computer-readable medium storing a setting program according to an embodiment of the present disclosure, when executed by an electronic device, causes the electronic device to output a password and setting information for another electronic device. The setting information is used to set the another electronic device. The password is used to lock a setting of the another electronic device.

A non-transitory computer-readable medium storing a setting program according to an embodiment of the present disclosure, when executed by an electronic device, causes the electronic device to acquire a password and setting information for the electronic device from another electronic device, change a setting of the electronic device on the basis of the setting information, and lock the setting of the electronic device using the password.

DETAILED DESCRIPTION

A terminal may be managed by MDM (Mobile Device Management). A setting associated with the MDM restricts the functionality of each terminal. There is a demand for security enhancement and improved efficiency in the setting of each terminal.

In light of the above demand, the present disclosure aims to provide a setting system, an electronic device, a setting method, and a setting program capable of enabling efficient setting operations in a state in which security has been enhanced.

The setting system, the electronic device, the setting method, and the setting program according to an embodiment of the present disclosure are capable of enabling efficient setting operations in a state in which security has been enhanced.

Figure 1:
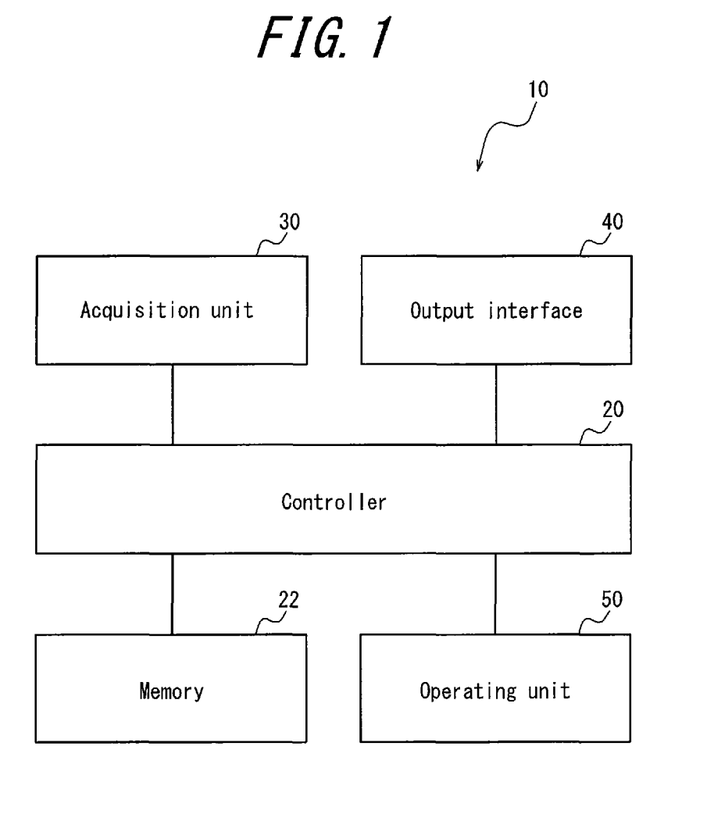
FIG. 1 is a block diagram illustrating an example configuration of an electronic device according to an embodiment.

As illustrated in FIG. 1, an electronic device 10 according to an embodiment is provided with a controller 20, a memory 22, an acquisition unit 30, and an output interface 40. The electronic device 10 may be further provided with an operating unit 50. The electronic device 10 may be managed by MDM. A function of the electronic device 10 may be restricted by a setting associated with the MDM. By restricting the function of the electronic device 10, the security of the electronic device 10 can be enhanced.

The controller 20 is coupled to each component of the electronic device 10 and may acquire information from each component or control each component. The controller 20 may execute an application associated with the MDM. The controller 20 may include one or more processors. The one or more processors may include a general-purpose processor for reading a specific program and performing a specific function, or a specialized processor dedicated to a specific process. The specialized processor may be an ASIC (Application Specific Integrated Circuit). The processor may include a PLD (Programmable Logic Device). The PLD may include an FPGA (Field-Programmable Gate Array). The controller 20 may be any one of a SoC (System on a Chip) and a SiP (System in a Package) in which one or more processors cooperate with one another.

The memory 22 may store various information, a program for operating each component of the electronic device 10, and the like. The memory 22 may be constituted of, for example, a semiconductor memory. The memory 22 may function as a working memory of the controller 20. The memory 22 may be included in the controller 20.

The acquisition unit 30 acquires information from another electronic device 10. The acquisition unit 30 may include, for example, an imaging device or a sensor, or a communication device. When the acquisition unit 30 includes the imaging device or the sensor, the acquisition unit 30 may acquire information by reading a barcode or a two-dimensional code output by another electronic device 10. The imaging device may be, for example, a camera. The sensor may be, for example, a sensor for detecting electromagnetic waves such as infrared rays or visible light. When the acquisition unit 30 includes the communication device, the acquisition unit 30 may acquire information on the basis of communication with another electronic device 10.

The output interface 40 outputs information to another electronic device 10. The output interface 40 may include, for example, a display device or a communication device. When the output interface 40 includes the display device, the output interface 40 may display a barcode or a two-dimensional code to be read by another electronic device 10. The display device may include, for example, a liquid crystal display, an organic EL (Electro Luminescent) display, an inorganic EL display, or an LED (Light Emitting Diode) display. When the output interface 40 includes the communication device, the output interface 40 may output information on the basis of communication with another electronic device 10.

The acquisition unit 30 and the output interface 40 may be configured as a single communication device. The communication device may include a communication interface for non-contact communication such as infrared communication or NFC (Near Field Communication). The communication device may include a communication interface such as a LAN (Local Area Network) interface. The communication device may include a communication interface capable of performing direct communication without a router. The communication device may include an interface such as a USB (Universal Serial Bus) interface.

The operating unit 50 may include a physical button or an input device such as a touch sensor or a proximity sensor. The controller 20 may control the electronic device 10 on the basis of an input from the operating unit 50.

The electronic device 10 may have various settings. The settings of the electronic device 10 may include, for example, a setting associated with the MDM. The settings of the electronic device 10 may include a setting for limiting a function of the electronic device 10. The settings of the electronic device 10 may include a setting for enhancing the security of the electronic device 10. The setting for enhancing the security of the electronic device 10 is also referred to as a security policy. The security policy may include, for example, a setting for restricting communication, a setting for restricting information output, a setting for restricting reset of the electronic device 10, and the like. The settings of the electronic device 10 may include contents specifying a display item, a display layout or the like of the display device. The settings of the electronic device 10 may include an address such as a MAC (Media Access Control) address or an IP (Internet Protocol) address in the communication device, or contents specifying communication contents and the like.

The electronic device 10 may change its settings. The electronic device 10 may change its settings on the basis of an input from the operating unit 50. The electronic device 10 may change its settings on the basis of information acquired from another electronic device 10. The information associated with the setting of the electronic device 10 may also be referred to as setting information. The electronic device 10 may output setting information for another electronic device 10. The electronic device 10 may acquire setting information from another electronic device 10.

The electronic device 10 locks its settings using a password. This makes it difficult for a third party who does not know the password to change the settings. As a result, the security of the electronic device 10 can be enhanced. The electronic device 10 may lock its settings using a password based on an input from the operating unit 50. The electronic device 10 may lock the settings using a password based on information acquired from another electronic device 10. The electronic device 10 may output information about a password (hereinafter referred to as password information) to be used by another electronic device 10. The electronic device 10 may receive password information from another electronic device 10.

In a state in which the setting of the electronic device 10 is locked by the password, the electronic device 10 may acquire password information based on an input from the operating unit 50, or acquire password information from another electronic device 10. The electronic device 10 may execute authentication on the basis of the acquired password information. When authenticated, the electronic device 10 may cancel locking of its settings. The cancelling of the locking may also be referred to as unlocking.

Figure 2:
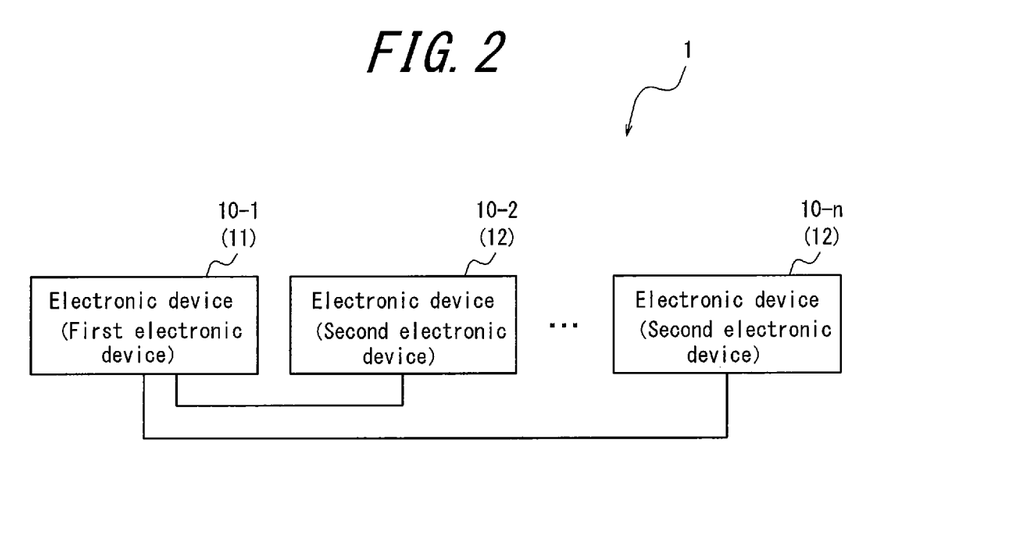
FIG. 2 is a block diagram illustrating an example configuration of a setting system according to an embodiment.

As illustrated in FIG. 2, a setting system 1 according to the embodiment includes a plurality of electronic devices 10. It is assumed that the setting system 1 including n electronic devices 10, where n is a positive integer of 2 or more. It is assumed that each of the electronic devices 10 is respectively identified by reference numerals 10-1, 10-2, to 10-n.

The electronic device 10 may exchange information by outputting information or acquiring information. The electronic device 10 may export settings by outputting setting information. The electronic device 10 may import settings by acquiring setting information. The electronic device 10 may output information including password information used in another electronic device 10 and setting information for another electronic device 10. The electronic device 10 may output the password information and the setting information all at once. The electronic device 10 may integrally output the password information and the setting information. The electronic device 10 may continuously output the password information and the setting information. The electronic device 10 may divide the information including the password information and the setting information and output the divided information as a series of information. For example, the electronic device 10 may divide the information into a plurality of barcodes or two-dimensional codes and output the divided information as a series of information. The electronic device 10 may divide the information into a plurality of communication packets and the like and output the divided information as a series of information.

The electronic device 10 may acquire the password information and the setting information for itself from another electronic device 10. When the electronic device 10 acquires information divided into a plurality of barcodes or two-dimensional codes from another electronic device 10, the electronic device 10 may process the information as a series of information. When the electronic device 10 acquires information divided into a plurality of packets or the like from another electronic device 10, the electronic device 10 may process the information as a series of information.

When the electronic device 10 outputs password information used by another electronic device 10 or setting information for another electronic device 10, the electronic device 10 is also referred to as a first electronic device 11 or a master device. When the electronic device 10 acquires password information or setting information for itself from another electronic device 10, the electronic device 10 is referred to as a second electronic device 12 or a slave device. The second electronic device 12 may set at least a subset of its settings to be the same as the settings of the first electronic device 11. In the setting system 1, it can be said that the settings of the electronic device 10 are copied from the first electronic device 11 to the second electronic device 12. The electronic device 10 may start operations as the first electronic device 11 or operations as the second electronic device 12 on the basis of an input from the operating unit 50.

The first electronic device 11 may output, to the second electronic device 12, a password that is the same as the password for locking the settings of the first electronic device 11. That is, the first electronic device 11 may lock the its settings using the password used to lock the settings of the second electronic device 12. In this manner, password management can be simplified.

The second electronic device 12 acquires the password information and the setting information from the first electronic device 11. The second electronic device 12 sets its settings on the basis of the setting information acquired from the first electronic device 11 and locks the its settings using the password acquired from the first electronic device 11. In this manner, it is possible to easily enhance security and set-up the device itself. When the settings of the second electronic device 12 are locked, the second electronic device 12 may unlock its settings using the password acquired from the first electronic device 11 and set its settings on the basis of the setting information acquired from the first electronic device 11. In this manner, the setting of the second electronic device 12 can set its settings in a state of enhanced security.

The second electronic device 12 may apply the setting for limiting its functionality on the basis of the setting information acquired from the first electronic device 11. The second electronic device 12 may apply the security policy to the setting of the self device. This can further enhance the security of the electronic device 10.

In FIG. 2, the electronic device 10-1 corresponds to the first electronic device 11. The electronic devices 10-2 to 10-*n* correspond to the second electronic devices 12. In this case, the electronic device 10-1 outputs the password information and the setting information to the electronic devices 10-2 to 10-*n*. The electronic devices 10-2 to 10-*n* acquire the password information and the setting information from the electronic device 10-1.

Figure 3:
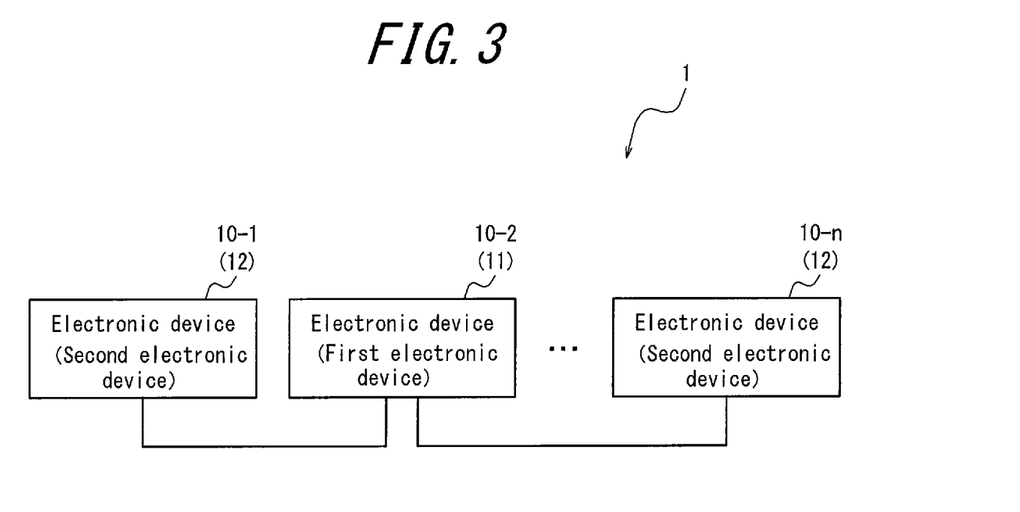
FIG. 3 is a block diagram illustrating an example configuration of a setting system according to an embodiment.

As illustrated in FIG. 3, the first electronic device 11 and the second electronic device 12 may be interchanged. The electronic device 10-2 corresponds to the first electronic device 11. The electronic devices 10-1 and 10-3 to 10-*n* correspond to the second electronic devices 12. In this case, the electronic device 10-2 outputs the password information and the setting information to the electronic devices 10-1 and 10-3 to 10-*n*. The electronic devices 104 and 10-3 to 10-*n* acquire the password information and the setting information from the electronic device 10-2.

Whether the electronic device 10 functions as the first electronic device 11 or the second electronic device 12 in the setting system 1 may be determined by a user operation. For example, a user may activate an application associated with the MDM on the electronic device 10 and input a command to cause the electronic device 10 to function as one of the first electronic device 11 and the second electronic device 12. The electronic device 10 may be set to function as the second electronic device 12 by means of an initial setting or a setting made at the time of shipping. When the electronic device 10 is set to function as the second electronic device 12, the electronic device 10 may activate a mode for acquiring information as an initial state.

Figure 4:
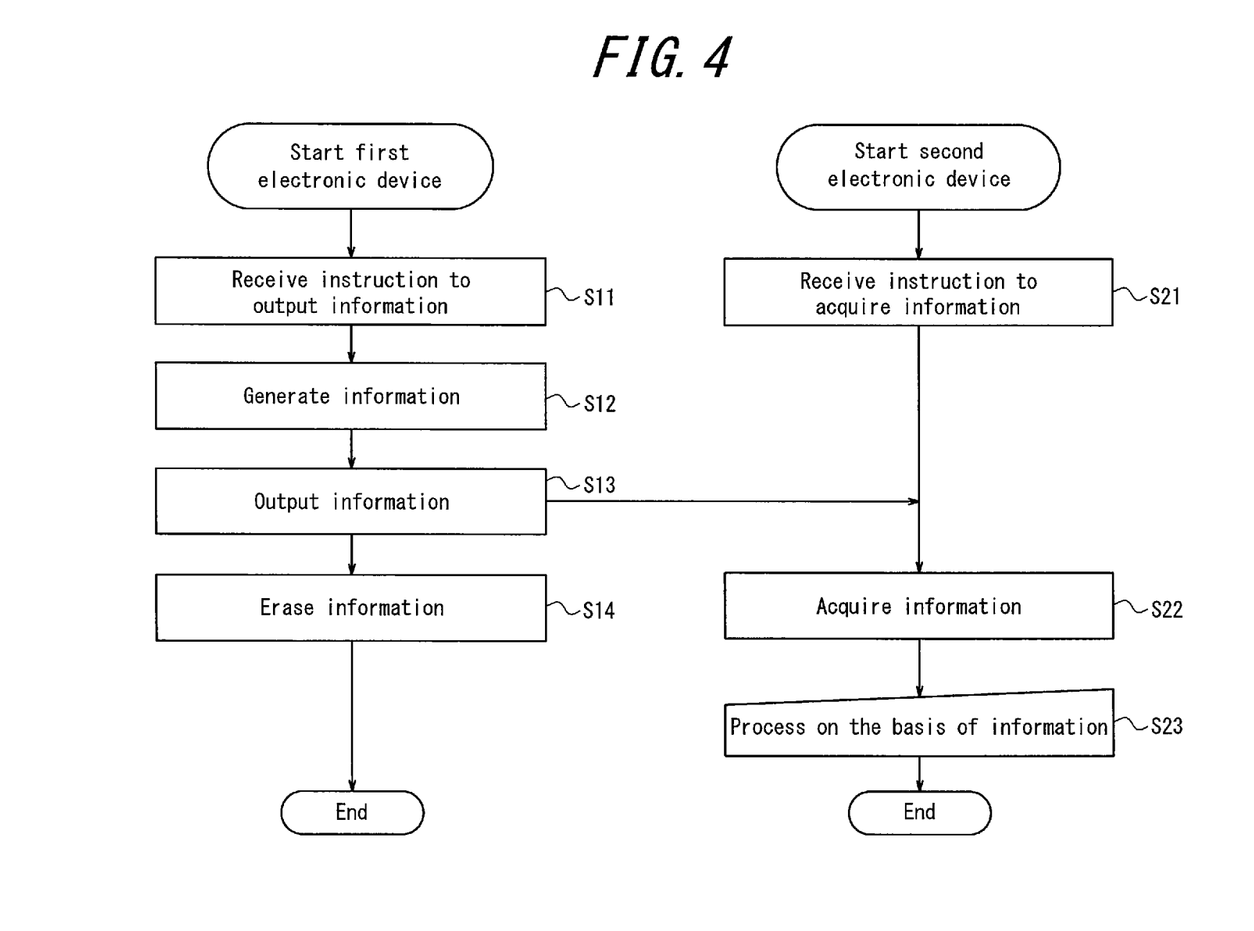
FIG. 4 is a flowchart illustrating an example procedure performed by a setting system.

The setting system 1 may change the settings of the electronic device 10 by following the procedure shown in the flowchart of FIG. 4.

The first electronic device 11 acquires an instruction to output the information (step S11). The first electronic device 11 may acquire the instruction to output the information on the basis of an input from the operating unit 50. The first electronic device 11 may acquire the instruction to output the information on the basis of a command inputted to the application associated with the MDM. The first electronic device 11 may acquire the instruction to output the information on the basis of activation of an application for exporting settings. The first electronic device 11 may acquire the instruction to output the information from the second electronic device 12 by communicating with the second electronic device 12. That is, the second electronic device 12 may request the first electronic device 11 to output the information. The second electronic device 12 may request the first electronic device 11 to output the information on the basis of an input from the operating unit 50.

The first electronic device 11 generates the information (step S12). The first electronic device 11 generates the information including the password information to be used by the second electronic device 12 and the setting information for the second electronic device 12. The information may include text data or binary data.

The second electronic device 12 receives the instruction to acquire the information (step S21). The second electronic device 12 may receive the instruction to acquire the information on the basis of an input from the operating unit 50. The second electronic device 12 may receive the instruction to acquire the information on the basis of a command inputted to the application associated with the MDM. The second electronic device 12 may receive the instruction to acquire the information on the basis of activation of an application for importing the settings. The second electronic device 12 may receive the instruction to acquire the information from the first electronic device 11 by communicating with the first electronic device 11. That is, the first electronic device 11 may request the second electronic device 12 to acquire the information. The first electronic device 11 may request the second electronic device 12 to acquire the information on the basis of an input from the operating unit 50.

The first electronic device 11 outputs the information (step S13). On the other hand, the second electronic device 12 acquires the information (step S22).

When the output interface 40 of the first electronic device 11 is a display device, the first electronic device 11 may display the information in the form of a bar code or a two-dimensional code. When the acquisition unit 30 of the second electronic device 12 is an imaging device or a sensor, the second electronic device 12 may acquire the information by reading the bar code or the two-dimensional code displayed by the first electronic device 11.

When the output interface 40 of the first electronic device 11 and the acquisition unit 30 of the second electronic device 12 are communication devices, the first electronic device 11 and the second electronic device 12 may communicate with each other. The first electronic device 11 may transmit the information as communication data. The second electronic device 12 may receive the information as the communication data.

After outputting the information, the first electronic device 11 erases the information (step S14). Easing the information makes it difficult for a third party to know the information including the password information. As a result, the security of the electronic device 10 can be enhanced. After step S14, the first electronic device 11 ends the procedure of the flowchart of FIG. 4.

On the other hand, the second electronic device 12 executes processing based on the acquired information (step S23). When the settings of the second electronic device 12 are not locked using a password, the second electronic device 12 changes its settings on the basis of the setting information included in the acquired information. After changing its settings, the second electronic device 12 may lock its settings on the basis of the password information included in the acquired information. The second electronic device 12 may determine whether to lock its settings using the password, on the basis of an input from the operating unit 50. When the settings of the second electronic device 12 are not locked by the password, the second electronic device 12 may lock its settings on the basis of the acquired password information. By locking its settings, the security of the electronic device 10 can be enhanced.

When the settings of the second electronic device 12 are locked by the password, the second electronic device 12 unlocks its settings on the basis of the password information input from the operating unit 50. The second electronic device 12 may execute authentication using the acquired password. When authenticated, the second electronic device 12 may unlock its settings.

Alternatively, when the settings of the second electronic device 12 are locked by the password, the second electronic device 12 unlocks its settings on the basis of the password information included in the acquired information. The second electronic device 12 may execute authentication using the acquired password. The second electronic device 12 may unlock its settings when authenticated.

In a state in which the settings of the second electronic device 12 are unlocked, the second electronic device 12 changes its settings on the basis of the setting information included in the acquired information. After changing the settings of the second electronic device 12, the second electronic device 12 locks its settings again. After step S23, the second electronic device 12 ends the procedure shown in the flowchart of FIG. 4.

Figure 5:
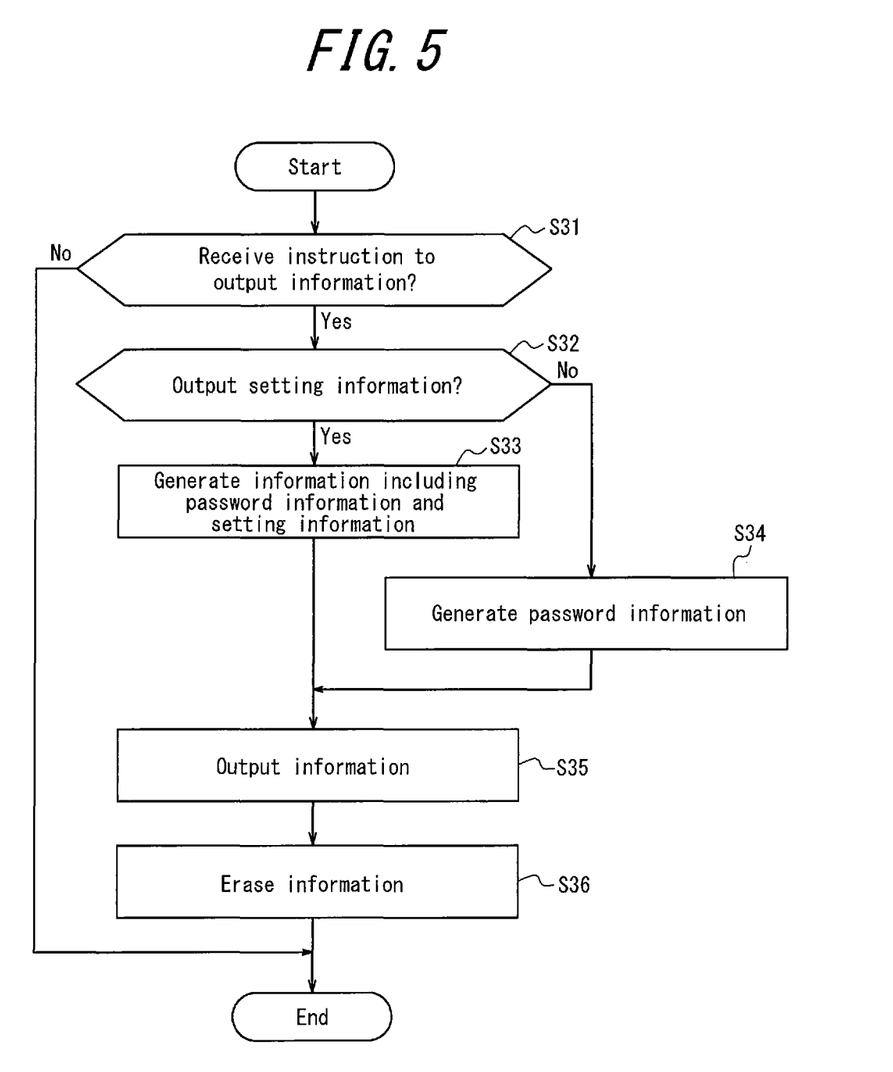
FIG. 5 is a flowchart illustrating an example procedure performed by a first electronic device.

The first electronic device 11 may execute the procedure shown in the flowchart of FIG. 5.

The first electronic device 11 determines whether an instruction to output information has been received (step S31). The first electronic device 11 may receive the instruction to output the information by following a procedure the same as, or similar to, the procedure executed in step S11 of FIG. 4. When the first electronic device 11 does not receive the instruction to output the information (a NO determination in step S31), the first electronic device 11 ends the procedure of the flowchart of FIG. 5.

When the first electronic device 11 receives the instruction to output information (a YES determination in step S31), the first electronic device 11 determines whether to output the setting information (step S32). The instruction to output the information specifies whether the information output by the first electronic device 11 includes the setting information. In other words, the first electronic device 11 determines whether to output only the password information or to output information including the password information and the setting information, on the basis of the instruction to output the information.

When the first electronic device 11 outputs the setting information (a YES determination in step S32), the first electronic device 11 generates the information including the password information to be used by the second electronic device 12 and the setting information for the second electronic device 12 (step S33). After step S33, the first electronic device 11 proceeds to step S35.

When the first electronic device 11 does not output the setting information (a NO determination in step S32), the first electronic device 11 generates the password information to be used by the second electronic device 12 (step S 34). After step S34, the first electronic device 11 proceeds to step S35.

The first electronic device 11 outputs the information generated in step S33 or step S34 (step S35).

The first electronic device 11 erases the generated information (step S36). The first electronic device 11 may erase the generated information after confirming that the second electronic device 12 has acquired the information. The first electronic device 11 may erase the generated information on the basis of an input from the operating unit 50. Erasing the information makes it difficult for third parties to know the information including the password information. As a result, the security of the electronic device 10 can be enhanced. After step S36, the first electronic device 11 ends the procedure shown in the flowchart of FIG. 5.

Figure 6:
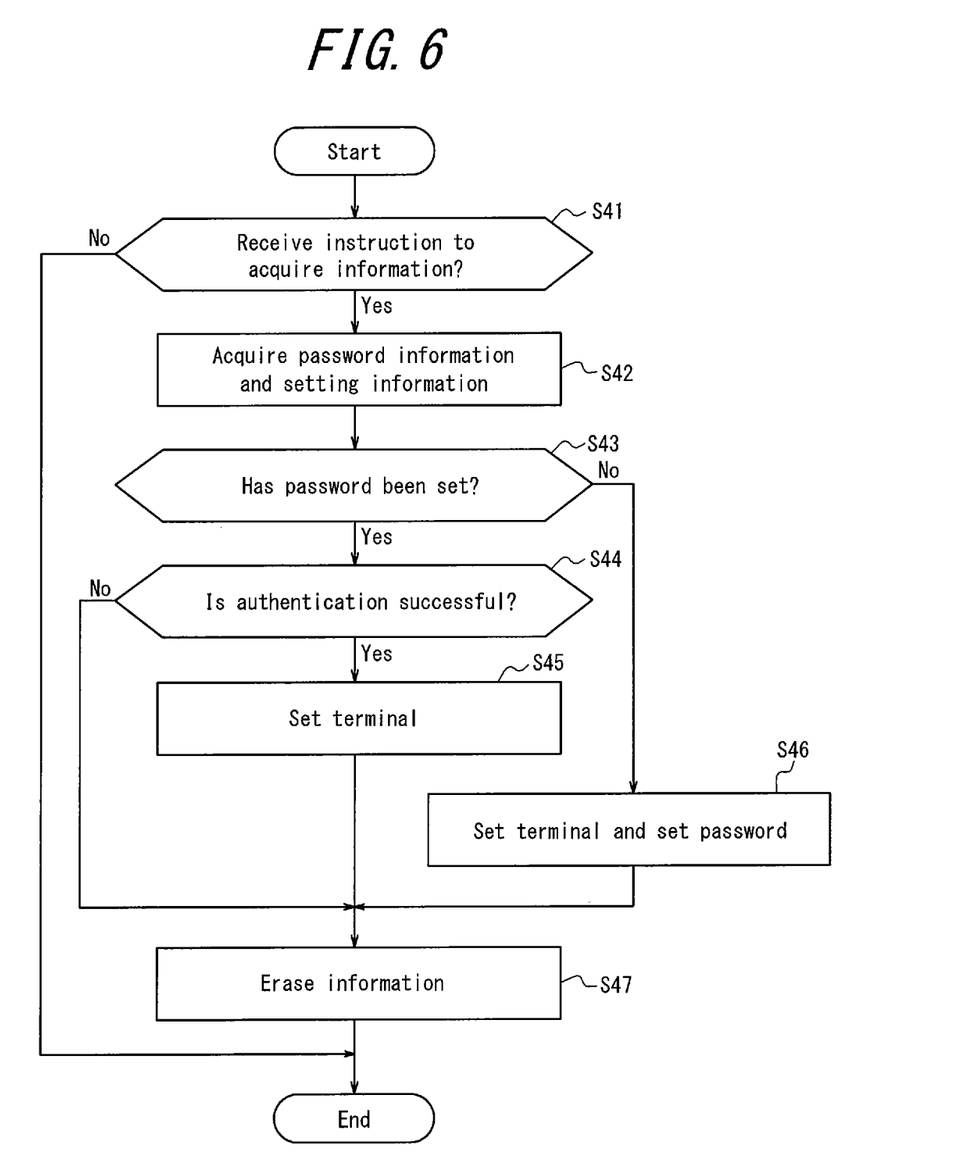
FIG. 6 is a flowchart illustrating an example procedure performed by a second electronic device.

The second electronic device 12 may execute the procedure shown in the flowchart of FIG. 6.

The second electronic device 12 determines whether the instruction to acquire the information has been received (step S41). The second electronic device 12 may receive the instruction to acquire the information by following a procedure the same as, or similar to, the procedure executed in step S21 of FIG. 4. When the second electronic device 12 does not receive the instruction to acquire the information (a NO determination in step S41), the second electronic device 12 ends the procedure shown in the flowchart of FIG. 6.

When the second electronic device 12 receives the instruction to acquire the information (a YES determination in step S41), the second electronic device 12 acquires the information including the password information to be used by the second electronic device 12 and the setting information for the second electronic device 12 (step S42).

The second electronic device 12 determines whether a password has been set for the second electronic device 12 (step S43).

When a password has been set for the second electronic device 12 (a YES determination in step S43), the second electronic device 12 determines whether the authentication based on the password information is successful (step S44). The password information used for the authentication may be information input from the operating unit 50 or information included in the information acquired by the second electronic device 12. The second electronic device 12 may execute the authentication by using the acquired password.

When the authentication is not successful (a NO determination in step S44), the second electronic device 12 proceeds to step S47. When the authentication is successful (a YES determination in step S44), the second electronic device 12 unlocks its settings and sets itself on the basis of the setting information included in the acquired information (step S45). After the second electronic device 12 sets itself, the second electronic device 12 locks its settings using the password. After step S45, the second electronic device 12 proceeds to step S47.

When a password is not set for the second electronic device 12 (a NO determination in step S43), the second electronic device 12 sets itself and sets a password on the basis of the acquired information (step S46). The second electronic device 12 sets itself on the basis of the setting information. The second electronic device 12 locks its settings using the password on the basis of the password information. After step S46, the second electronic device 12 proceeds to step S47.

The second electronic device 12 erases the acquired information (step S47). The second electronic device 12 may erase the acquired information on the basis of an input from the operating unit 50. The second electronic device 12 may automatically erase the acquired information after completing its setting and the setting of a password. Erasing the information makes it difficult for third parties to know the information including the password information. As a result, the security of the electronic device 10 can be enhanced. After step S47, the second electronic device 12 ends the procedure shown in the flowchart of FIG. 6.

Figure 7:
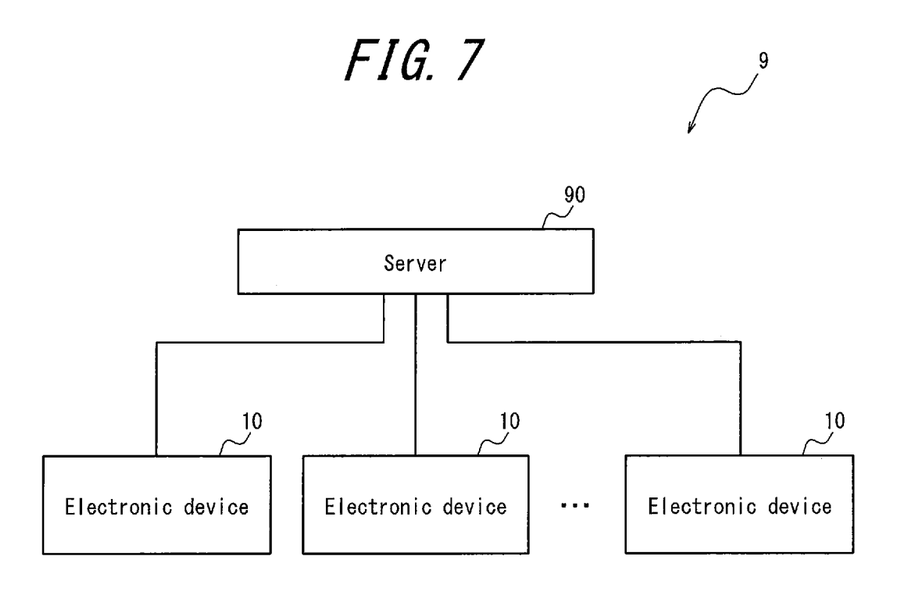
FIG. 7 is a block diagram illustrating a setting system according to a comparative example.

A setting system 9 according to a comparative example illustrated in FIG. 7 includes a server 90 connected to the electronic devices 10. In the comparative example, each electronic device 10 acquires setting information from the server 90 and sets itself. The inclusion of the server 90 in the configuration of the comparative example potentially increases the cost. On the other hand, the setting system 1 according to the present embodiment enables the setting of each of the electronic devices 10 by exchanging information therebetween without using another device such as the server 90. This can reduce the cost for the system configuration. In the setting system according to the present embodiment, the electronic device 10 may acquire the setting information without using network. This can enhance the security.

In another comparative example, the electronic device 10 performs authentication on the basis of a password input via the operating unit 50, and unlocks the setting of the electronic device 10. In the setting system 1 according to the present embodiment, on the other hand, the electronic device 10 acquires the password information together with the setting information. Thus, the number of input operations in respect to the electronic device 10 can be reduced, while maintaining a state in which the security is enhanced.

According to the present embodiment, any electronic device 10 may function as the first electronic device 11. Thus, there is no need for a specialized device for outputting the setting information for the electronic devices 10. Thus, the setting system 1 can be configured more freely.

The electronic device 10 may be a portable device such as a mobile phone or a smartphone. The electronic device 10 is not limited thereto but may be other various devices.

Although the present disclosure has been described on the basis of the figures and the embodiments, it is to be understood that various modifications and changes may be implemented by those who are ordinarily skilled in the art on the basis of the present disclosure. Accordingly, such modifications and changes are encompassed by the scope of the present disclosure. For example, a function and the like included in each component or step may be rearranged without logical inconsistency, so as to combine a plurality of components or steps together or to separate them. It should also be understood that, although the devices have been mainly described herein, the embodiment of the present disclosure may be realized by a method that includes a step executed by each component. The embodiment of the present disclosure may also be realized by a method to be executed by the processor of the device, a program, or a storage medium storing the program, which should thus be appreciated as being encompassed by the scope of the present disclosure.

In the present disclosure, descriptions such as the "first" and the "second" are identifiers for distinguishing the components. In configurations distinguished by the "first" and the "second" in the present disclosure, these identifiers are interchangeable. For example, the identifier "first" of the first electronic device and the identifier "second" of the second electronic device may be interchanged with each other. The interchange of the identifiers is performed simultaneously. After the interchange of the identifiers, the distinction between the components is maintained. The identifiers may be removed. The components from which the identifiers are removed may be distinguished by codes. The identifiers such as the "first" and the "second" used herein should not be used for interpreting the order of the components or used as a ground for the existence of an identifier with a smaller number.

The invention claimed is:

1. A setting system comprising:
a first electronic device and a second electronic device,
wherein the first electronic device is configured to output information including a password and setting information for the second electronic device, and
the second electronic device is configured to acquire the password and the setting information from the first electronic device, change a setting of the second electronic device on the basis of the setting information, and lock the setting of the second electronic device using the password, and
wherein the first electronic device is further configured to automatically erase the information including the password and the setting information from a memory of the first electronic device after confirming that the second electronic device has acquired the information from the first electronic device.

2. The setting system according to claim 1,
wherein the first electronic device is configured to lock a setting of the first electronic device using the password.

3. The setting system according to claim 2,
wherein, in a state in which the setting of the second electronic device has been locked using the password, the second electronic device
acquires the password from the first electronic device and,
when authentication based on the password is successful, unlocks the setting of the second electronic device and changes the setting of the second electronic device on the basis of the setting information.

4. The setting system according to claim 3,
wherein the setting information is information for restricting a function of the second electronic device.

5. The setting system according to claim 3,
wherein the second electronic device sets at least a part of the setting of the second electronic device to be the same as a setting of the first electronic device.

6. The setting system according to claim 2,
wherein the setting information is information for restricting a function of the second electronic device.

7. The setting system according to claim 6,
wherein the second electronic device sets at least a part of the setting of the second electronic device to be the same as a setting of the first electronic device.

8. The setting system according to claim 2,
wherein the second electronic device sets at least a part of the setting of the second electronic device to be the same as a setting of the first electronic device.

9. The setting system according to claim 1,
wherein, in a state in which the setting of the second electronic device has been locked using the password, the second electronic device
acquires the password from the first electronic device and, when authentication based on the password is successful, unlocks the setting of the second electronic device and changes the setting of the second electronic device on the basis of the setting information.

10. The setting system according to claim 9,
wherein the setting information is information for restricting a function of the second electronic device.

11. The setting system according to claim 10,
wherein the second electronic device sets at least a part of the setting of the second electronic device to be the same as a setting of the first electronic device.

12. The setting system according to claim 9,
wherein the second electronic device sets at least a part of the setting of the second electronic device to be the same as a setting of the first electronic device.

13. The setting system according to claim 1,
wherein the setting information is information for restricting a function of the second electronic device.

14. The setting system according to claim 13,
wherein the second electronic device sets at least a part of the setting of the second electronic device to be the same as a setting of the first electronic device.

15. The setting system according to claim 1,
wherein the second electronic device sets at least a part of the setting of the second electronic device to be the same as a setting of the first electronic device.

16. An electronic device comprising:
at least one hardware processor configured to:
output information including a password and setting information for another electronic device, wherein the setting information is used to set the other electronic device, and the password is used to lock a setting of the other electronic device; and
automatically erase the information including the password and the setting information from a memory of the electronic device after confirming that the other electronic device has acquired the information from the electronic device.

* * * * *